US011072980B2

(12) United States Patent
Sonar et al.

(10) Patent No.: US 11,072,980 B2
(45) Date of Patent: Jul. 27, 2021

(54) CONSTANT-VELOCITY JOINT WITH SURFACE CONTACT FORKS

(71) Applicant: Halliburton Energy Services, Inc., Houston, TX (US)

(72) Inventors: Sandip Satish Sonar, Edmonton (CA); Hamid Sadabadi, Edmonton (CA); Neil Roy Choudhury, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 924 days.

(21) Appl. No.: 15/566,491

(22) PCT Filed: May 19, 2015

(86) PCT No.: PCT/US2015/031561
§ 371 (c)(1),
(2) Date: Oct. 13, 2017

(87) PCT Pub. No.: WO2016/186657
PCT Pub. Date: Nov. 24, 2016

(65) Prior Publication Data
US 2018/0094493 A1 Apr. 5, 2018

(51) Int. Cl.
*E21B 17/05* (2006.01)
*E21B 4/04* (2006.01)
(Continued)

(52) U.S. Cl.
CPC ............. *E21B 17/05* (2013.01); *E21B 4/02* (2013.01); *F16D 3/18* (2013.01); *F16D 3/265* (2013.01)

(58) Field of Classification Search
CPC ..... F16D 3/04; F16D 3/10; F16D 3/26; F16D 3/265; F16D 3/38; F16D 3/40; F16D 3/41;
(Continued)

(56) References Cited

U.S. PATENT DOCUMENTS 2,011,147 A * 8/1935 Haselau ................... F16D 3/34
464/104
2,892,328 A * 6/1959 Templeton ............... F16D 3/04
464/85

(Continued)

OTHER PUBLICATIONS

International Patent Application No. PCT/US2015/031561, "International Search Report and Written Opinion", dated Dec. 14, 2015, 15 pages.

*Primary Examiner* — Jonathan P Masinick
(74) *Attorney, Agent, or Firm* — Kilpatrick Townsend & Stockton LLP

(57) ABSTRACT

A constant-velocity joint can have three pieces: a yoke, a first adaptor, and a second adaptor. Grooves on opposite sides of the yoke can receive forks of the adaptors and be perpendicular to one another. The yoke can have a guide surface within each groove so that a matching following surface on the fork of the adaptor can engage the guide surface to guide the movement of the fork within the groove. The adaptors may pivot within the grooves such that surfaces of flanks of the forks remain engaged or provide a consistent amount of surface contact with flanks of the groove throughout the pivot of the forks. Torque can be transferred through the engaged flanks as the joint is used to convert eccentric rotation to concentric rotation.

7 Claims, 5 Drawing Sheets

(51) Int. Cl.
*F16D 3/18* (2006.01)
*F16D 3/26* (2006.01)
*E21B 4/02* (2006.01)

(58) Field of Classification Search
CPC ... F16D 3/44; F16D 3/46; E21B 17/05; E21B 14/02
See application file for complete search history.

(56) References Cited

U.S. PATENT DOCUMENTS

| | | | | |
|---|---|---|---|---|
| 3,429,143 A * | 2/1969 | Sabre | ............... | F16D 3/44 464/149 |
| 4,331,003 A * | 5/1982 | Peterson | ............... | F16D 3/28 464/149 |
| 4,599,056 A * | 7/1986 | Crase | ............... | E21B 43/121 418/48 |
| 4,834,658 A * | 5/1989 | Kotani | ............... | F16D 3/46 439/8 |
| 4,921,470 A * | 5/1990 | Kotani | ............... | F16D 3/46 464/147 |
| 5,022,645 A * | 6/1991 | Green | ............... | B65H 5/021 271/276 |
| 5,078,650 A * | 1/1992 | Foote | ............... | E21B 4/02 418/48 |
| 5,226,852 A * | 7/1993 | Asaba | ............... | F16D 3/04 464/104 |
| 5,267,903 A * | 12/1993 | Kuribayashi | ............... | F16D 3/04 464/104 |
| 5,288,271 A | 2/1994 | Nelson et al. | | |
| 5,423,722 A * | 6/1995 | Beauch | ............... | B62D 1/187 403/74 |
| 5,440,839 A * | 8/1995 | Piltingsrud | ............... | F16D 3/46 49/342 |
| 6,517,439 B1 * | 2/2003 | Sears | ............... | F16D 3/04 464/104 |
| 8,469,830 B2 * | 6/2013 | Zhao | ............... | F16D 3/46 464/151 |
| 8,736,120 B2 * | 5/2014 | Maeda | ............... | F16D 3/04 310/75 D |
| 8,852,174 B2 * | 10/2014 | Burbank | ............... | A61B 34/10 606/1 |
| 10,443,661 B2 * | 10/2019 | Sweetwood | ............... | F16D 3/44 |
| 10,487,882 B2 | 11/2019 | Kuhn et al. | | |
| 2004/0157666 A1 * | 8/2004 | Taniguchi | ............... | F16D 3/04 464/104 |
| 2009/0230825 A1 * | 9/2009 | Braun | ............... | F16D 3/04 310/75 D |
| 2014/0179448 A1 | 6/2014 | Collins et al. | | |
| 2015/0167399 A1 * | 6/2015 | Kuhn | ............... | E21B 4/02 464/18 |

* cited by examiner

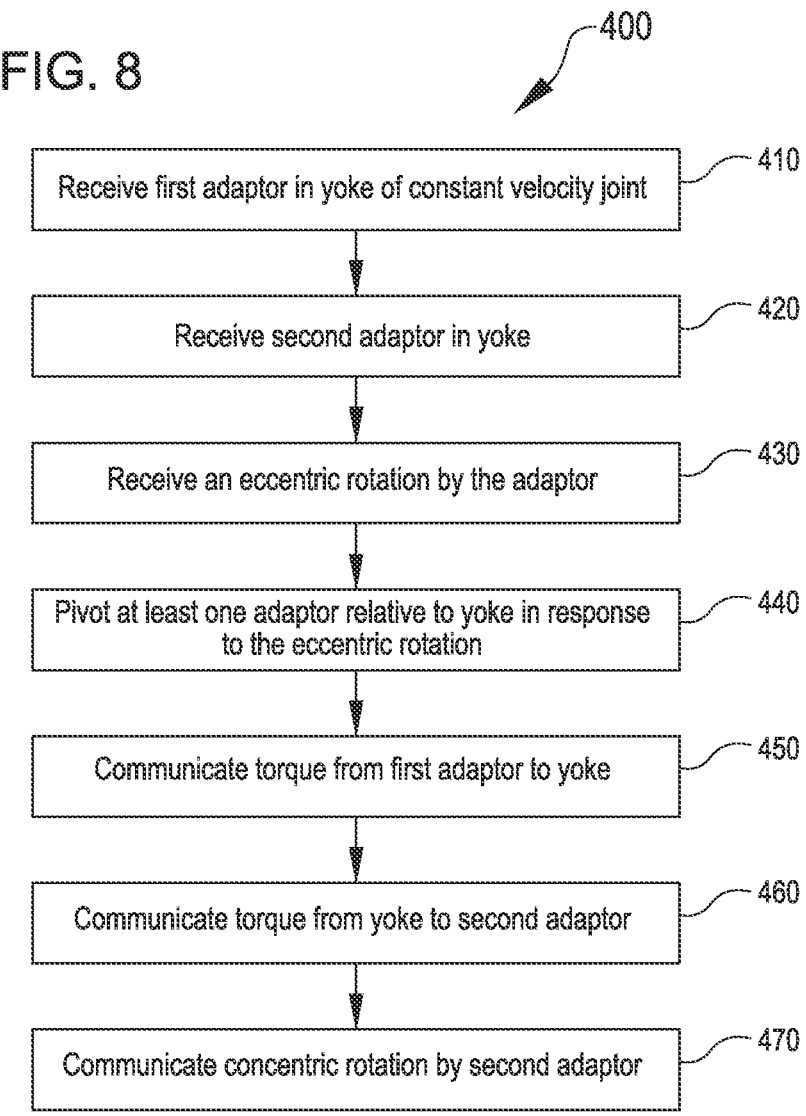

CONSTANT-VELOCITY JOINT WITH SURFACE CONTACT FORKS

CROSS-REFERENCE TO RELATED APPLICATIONS

This is a U.S. national phase under 35 U.S.C. 371 of International Patent Application No. PCT/US2015/031561 titled "Constant-Velocity Joint With Surface Contact Forks" and filed May 19, 2015, the entirety of which is incorporated herein by reference.

TECHNICAL FIELD

The present disclosure relates generally to devices for use in a wellbore in a subterranean formation and, more particularly (although not necessarily exclusively), to constant-velocity joints with forks that can provide a consistent amount of surface contact throughout movement of the joint.

BACKGROUND

Various devices can be placed in a well traversing a hydrocarbon bearing subterranean formation. Some devices may include components that can be moved to accomplish functions within the well. For example, a drill bit may be moved in a well to break up portions of a formation and expand a wellbore. Power or forces can be transferred to such movable components by other components, such as mud motors, in the wellbore. In some scenarios, an amount of power or torque that can be transferred from one component to another component may be limited by mechanisms used to couple the components to one another. Such limitations may prevent use of higher levels of force of torque in downhole operations, which may lead to decreased efficiency or increased cost of wellbore operations.

BRIEF DESCRIPTION OF THE DRAWINGS

FIG. 8 is a flow chart illustrating an example of a method for converting rotation with a constant velocity joint according to some aspects of the present disclosure.

DETAILED DESCRIPTION

Figure 1:
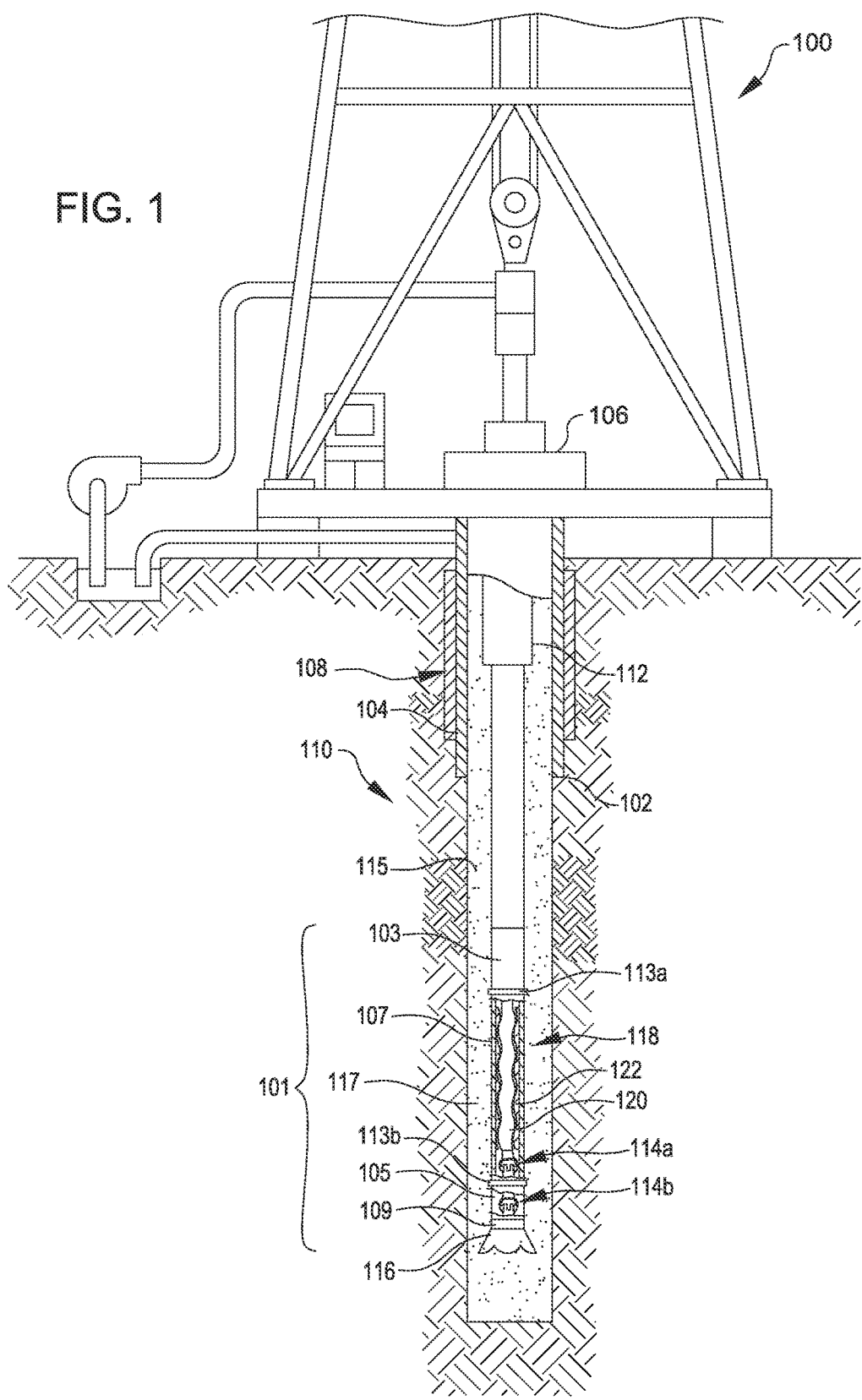
FIG. 1 is a schematic illustration of a well system having constant-velocity joints according to some aspects of the present disclosure.

Certain aspects and examples of the present disclosure are directed to constant-velocity joints for connecting or coupling components used in wellbore equipment. A constant-velocity joint can be used individually or in conjunction with other constant-velocity joints to convert eccentric rotation into concentric rotation. The joint can include parts that have significant amounts of surface area in engagement with mating parts. The amount of the surface area in engagement may be maintained regardless of the relative orientation of the parts with respect to one another. For example, the constant-velocity joint can have a tab or fork that rides in a groove so that flanks of the fork remain in contact with flanks of the groove regardless of the position of the fork along the length or span of the groove. In some aspects, the forks can provide a consistent amount of surface contact throughout the movement of the joint. The significant or consistent amount of surface area and engagement between parts of the constant-velocity joint can allow the joint to withstand and transfer significant amounts of forces (e.g., torque) between coupled elements. This may allow increased amounts of forces or torques to be employed downhole, such as to improve efficacy of downhole operations.

In one example, a constant-velocity joint has three pieces: a yoke, a first adaptor, and a second adaptor. The first adaptor can be received in a first side of the yoke, and the second adaptor can be received in a second, opposite side of the yoke. The yoke can include grooves for receiving forks of the adaptors. The yoke can have a guide surface within each groove so that a matching following surface on the fork of the adaptor can engage the guide surface to facilitate or guide the movement of the fork within the groove. The guide surface and the following surface can be spherical. The groove can have a greater arc or length than the fork so that the fork can pivot between sides of the groove. The adaptors may pivot or slide within the grooves, such as from a position with a fork abutting one side of a groove to a position with the fork abutting an opposite side.

In this example, the grooves on the first side of the yoke can be perpendicular to the grooves on the second side. This can allow the adaptors to pivot within the grooves such that any motion transmitted to the joint can be accommodated. For example, motion transmitted to the joint in a first direction (e.g., along a first axis) can be accommodated by inclination of the first adaptor in the first set of grooves, while motion in a second direction (e.g., along a second, perpendicular axis) can be accommodated by inclination of the second adaptor in the second, perpendicular set of grooves on the opposite side of the yoke. Pivoting of the forks within the groove can allow surfaces of the flanks of the forks to remain in contact or engagement with flanks of the groove. Such engagement can provide large or significant amounts of surface area for transferring of torque between the adaptor fork and the yoke groove.

These illustrative examples are given to introduce the reader to the general subject matter discussed here and are not intended to limit the scope of the disclosed concepts. The following describes various additional aspects and examples with reference to the drawings, in which like numerals indicate like elements, and directional descriptions (e.g., "left" or "right") are used to describe the illustrative aspects in relation to the corresponding figures. Some reference numerals used to identify groups of features in the following may appear occasionally or exclusively in the drawings with letter suffixes to identify individual features within the group (e.g. first grooves 208 in FIG. 2 also appear individually as 208A and 208B in FIG. 3). Like the illustrative aspects, the numerals and directional descriptions included in the following should not be used to limit the present disclosure.

FIG. 1 schematically depicts an example of a well system 100 having constant-velocity joints 114. The well system 100 can include a bore that is a wellbore 102 extending through various earth strata. The wellbore 102 can extend through a hydrocarbon bearing subterranean formation 110. A casing string 104 can extend from the surface 106 to the subterranean formation 110. The casing string 104 may be coupled to a wall of the wellbore 102 by a cement sheath 108. The casing string 104 can provide a conduit via which formation fluids, such as production fluids produced from the subterranean formation 110, can travel from the wellbore 102 to the surface 106.

A tool string 112 within the wellbore 102 can extend from the surface into the subterranean formation 110, e.g., in a downhole direction toward the toe of the well. In some aspects, the wellbore 102 can include a fluid 115 (e.g., mud). The fluid 115 can flow in an annulus 117 around the tool string 112, such as between a side of the tool string 112 and a side of the wellbore 102. In some aspects, the tool string 112 can include a drill bit 116 introduced into the well system 100 for drilling the wellbore 102 through the various earth strata. In other aspects, the tool string 112 can be introduced without the drill bit 116. As a non-limiting example of a tool string 112 without a drill bit 116, the tool string 112 may be part of a wireline tool utilized for downhole well operations.

The tool string 112 can include a well tool 101 (e.g., a logging-while-drilling tool) positioned in the wellbore 102. The well tool 101 can include various subsystems 103, 105, 107, 109. For example, the well tool 101 can include a subsystem 103 that includes a communication subsystem. The well tool 101 can also include a subsystem 105 that includes a saver subsystem or a rotary steerable system. One or more tubular sections or intermediate subsystems 107 (e.g., with a motor, a measuring-while-drilling module, or other components) can be positioned between the other subsystems 103, 105. In some examples, the well tool 101 can include the drill bit 116 for drilling the wellbore. The drill bit 116 can be coupled to another tubular section or intermediate subsystem 109 (e.g., a measuring-while-drilling module or a rotary steerable system). In some aspects, the well tool 101 can also include tubular joints 113a, 113b.

The tool string 112 can include one or more constant-velocity joints 114. In some aspects, the tool string 112 includes a mud motor 118, such as in an intermediate subsystem 107. The mud motor 118 can have a shaft 120 within a housing 122. Fluid 115 (such as drilling mud) passed through the housing 122 can cause the shaft 120 to rotate eccentrically within the housing 122. The shaft 120 may have an eccentricity of approximately between 0.1 and 0.3 inches, for example, though eccentricities of other sizes are possible. The shaft 120 can be coupled with a first constant-velocity joint 114a. The first constant-velocity joint 114a may be used to convert eccentric rotation of the shaft 120 of the mud motor 118 into concentric rotating motion, such as for the drill bit 116 or other rotating components in the tool string 112. The first constant-velocity joint 114a may convert eccentric rotating motion to concentric rotating motion individually or in conjunction with one or more other constant-velocity joints. For example, a conversion shaft between the mud motor 118 and the drill bit 116 may be coupled to the mud motor 118 by the first constant-velocity joint 114a and coupled to the drill bit 116 by a second constant-velocity joint 114b. Although the constant-velocity joints 114 shown in FIG. 1 are coupled with the mud motor 118 and the drill bit 116, the constant-velocity joints 114 additionally or alternatively may be coupled with other components in the tool string 112, such as for converting eccentric rotation into concentric rotation between components in the tool string 112. Although FIG. 1 shows two constant-velocity joints 114, some applications may use a different number of constant-velocity joints 114, including one or more than two.

FIG. 1 depicts the constant-velocity joint 114 in a section of the wellbore 102 that is substantially vertical. The constant-velocity joint 114 can be located, additionally or alternatively, in sections of the wellbore 102 that have other orientations, including substantially horizontal. In some aspects, the constant-velocity joint 114 can be disposed in simpler wellbores, such as in wellbores without the casing string 104.

Figure 2:
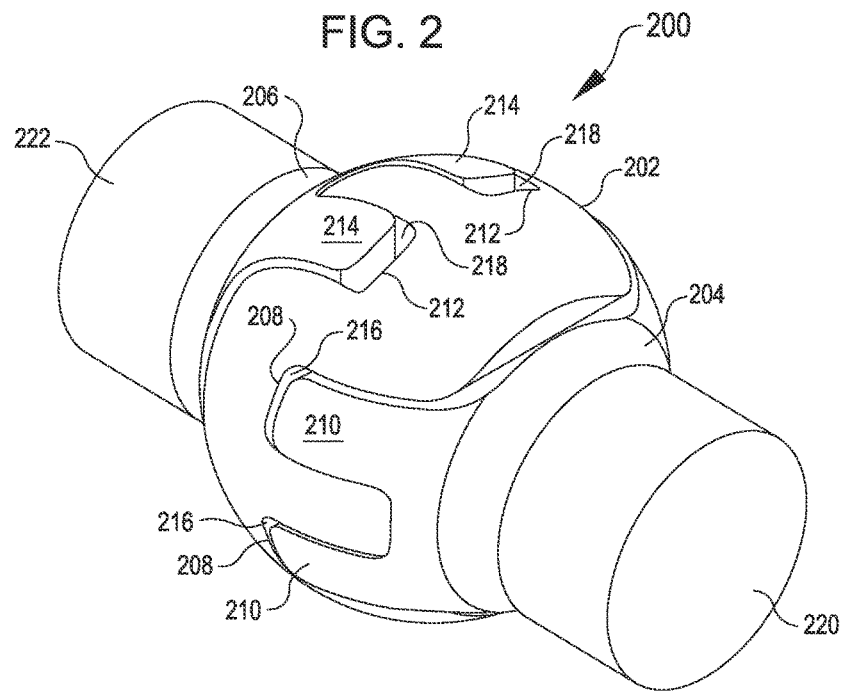
FIG. 2 is a perspective view of an example of a constant-velocity joint according to some aspects of the present disclosure.

Different types of constant-velocity joint 114 can be used in the well system 100 depicted in FIG. 1. For example, FIG. 2 shows a perspective view of an example of a constant-velocity joint 200 according to certain aspects. The constant-velocity joint 200 can have a three-piece construction. For example, the constant-velocity joint 200 can include a yoke 202, a first adaptor 204, and a second adaptor 206. The first adaptor 204 can be received in a first side of the yoke (e.g., the right side of FIG. 2) and the second adaptor 206 can be received in a second side of the yoke 202 (e.g., the left side of the FIG. 2). The yoke 202 can include first grooves 208 that receive first tabs or forks 210 of the first adaptor 204. Second grooves 212 can respectively receive second tabs or forks 214 on a second side of the yoke 202. The first grooves 208 can be perpendicular to the second grooves 212.

The forks 210, 214 can occupy less than an entirety of the grooves 208, 212. For example, gaps 216, 218 may be respectively defined between the forks 210, 214 and the grooves 208, 212. The first gaps 216 can allow the first adaptor 204 to move within the first grooves 208 of the yoke 202 during operation of the constant-velocity joint 200. For example, the first gaps 216 may expand or contract as the first forks 210 move within the first grooves 208, e.g., toward or away from the first gaps 216.

The first adaptor 204 and the second adaptor 206 can respectively have shafts 220, 222. The shafts 220, 222 can be connected to other components. For example, the shafts 220, 222 can be respectively coupled to elements to convert rotation between the coupled elements (e.g., between eccentric and concentric rotation). In one example, the first shaft 220 can be coupled with an eccentrically rotating shaft (such as the shaft 120 of the mud motor described above with respect to FIG. 1) and the second shaft 222 can be coupled with a shaft constrained to be rotated concentrically (such as for driving the drill bit 116 described above with respect to FIG. 1).

Figure 3:
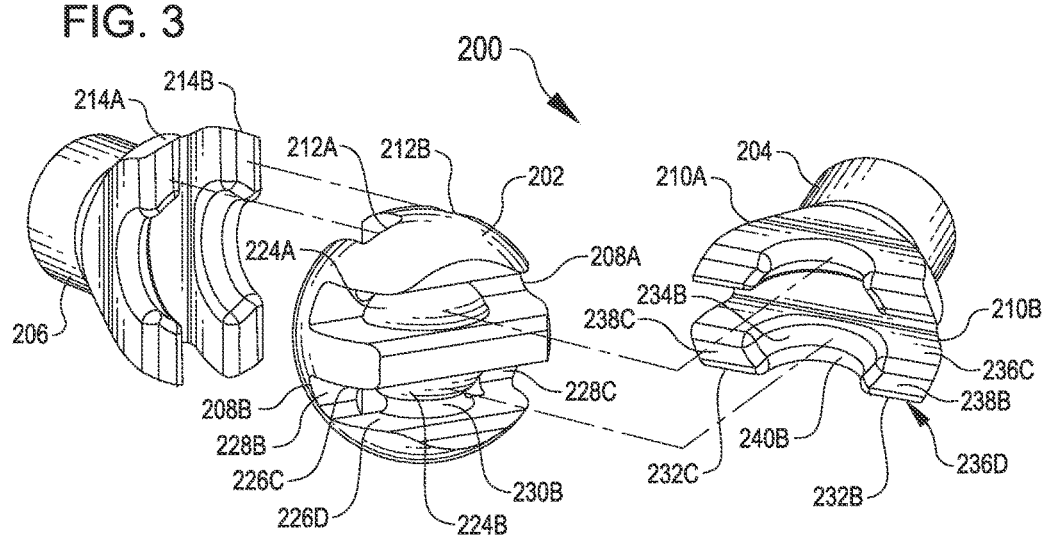
FIG. 3 is an exploded view of the constant-velocity joint of FIG. 2 according to some aspects of the present disclosure.

FIG. 3 illustrates an exploded view of the constant-velocity joint 200 according to certain aspects. The various components of the constant-velocity joint 200 can include various surfaces to facilitate operation of the constant-velocity joint 200. For example, the yoke 202 can include various surfaces arranged within each groove 208, 212. A particular first groove 208B can include a guide surface 224B, torque surfaces 226C, 226D, constraining surfaces 228B, 228C, and a support surface 230B.

The guide surface 224B can be spherical. The guide surface 224B can be positioned at an inner end of the groove 208B. The guide surface 224B can extend from the inner end of the groove 208B. The guide surface 224B can face an outer end of the groove 208B. The guide surface 224B may be accessible through an open end of the groove 208B opposite the inner end of the groove 208B.

The torque surfaces 226C, 226D may be arranged along the flanks of the groove 208B, for example, extending between an inner end of the groove 208B and an open outer end of the groove 208B.

The constraining surfaces 228B, 228C can be positioned at the sides of the groove 208B, for example, on either side of the guide surface 224B. The support surface 230B can reinforce the guide surface 224B and extend from the guide surface 224B to a flank of the groove 208B.

The first adaptor 204 can include various features that interact with features of the yoke 202 to facilitate operation of the constant-velocity joint 200. For example, a particular first fork 210B of the first adaptor 204 can include features for interacting with the particular first groove 208B just discussed. The first fork 210B can include prongs 232 (e.g., a pair of prongs 232B and 232C). The first fork 210B can include a following surface 234B. The following surface 234B may be positioned between the prongs 232B and 232C of the first fork 210B. The following surface 234B can engage the guide surface 224B in the groove 208B of the yoke 202 when the constant-velocity joint 200 is assembled. For example, the following surface 234B and the guide surface 224B may have corresponding spherical shapes. The following surface 234B can glide along the guide surface 224B to direct movement of the fork 2108 within the groove 208B.

The fork 210B can also have torque surfaces 236C, 236D. The torque surfaces 236C, 236D can face the torque surfaces 226C, 226D of the yoke 202 when the constant-velocity joint 200 is assembled. Torque can be transferred through facing torque surfaces 226 and 236. For example, rotation of the first adaptor 204 in a first direction can cause a transfer of torque through the torque surface 236C of the first adaptor 204 into the facing torque surface 226C of the yoke 202. Alternatively, rotation of the first adaptor 204 in a second, opposite direction can cause a transfer of torque to instead occur through the torque surface 236D of the first adaptor 204 into the facing torque surface 226D of the yoke 202.

The prongs 232B, 232C of the fork 210B can include tips 238B, 238C. The tips 238B, 238C may engage the constraining surfaces 228B, 228C in operation of the constant-velocity joint 200. For example, the tip 238B may engage the constraining surface 228 as the fork 2108 rotates toward the side of the groove 208B having the constraining surface 228B. Such engagement may prevent the fork 210B from rotating further in that direction. Similarly, an opposite direction of rotation of the fork 210B in the groove 208B may be limited by the tip 238C being moved into engagement with the constraining surface 228C.

The following surface 234B may be proximate to a contoured surface 240B. The contoured surface 240B can be shaped to match the support surface 230B in the groove 208B, such as to further direct or facilitate sliding or gliding of the fork 210B within the groove 208B.

Although features of one particular fork 210B and one corresponding particular groove 208B have just been described with respect to FIG. 3, other forks 210A, 214A, 214B and grooves 208A, 212A, 212B shown in FIG. 3 may have similar features. In some aspects, features corresponding to second grooves 212 on one side of the yoke 202 are perpendicular to respective features corresponding to first grooves 208 on an opposite side of the yoke 202. Additionally or alternatively, in some aspects, multiple or all of the guide surfaces 224 in grooves 208, 212 of the yoke 202 define respective portions of a spherical boundary of a shared spherical volume within the yoke 202.

Figure 4:
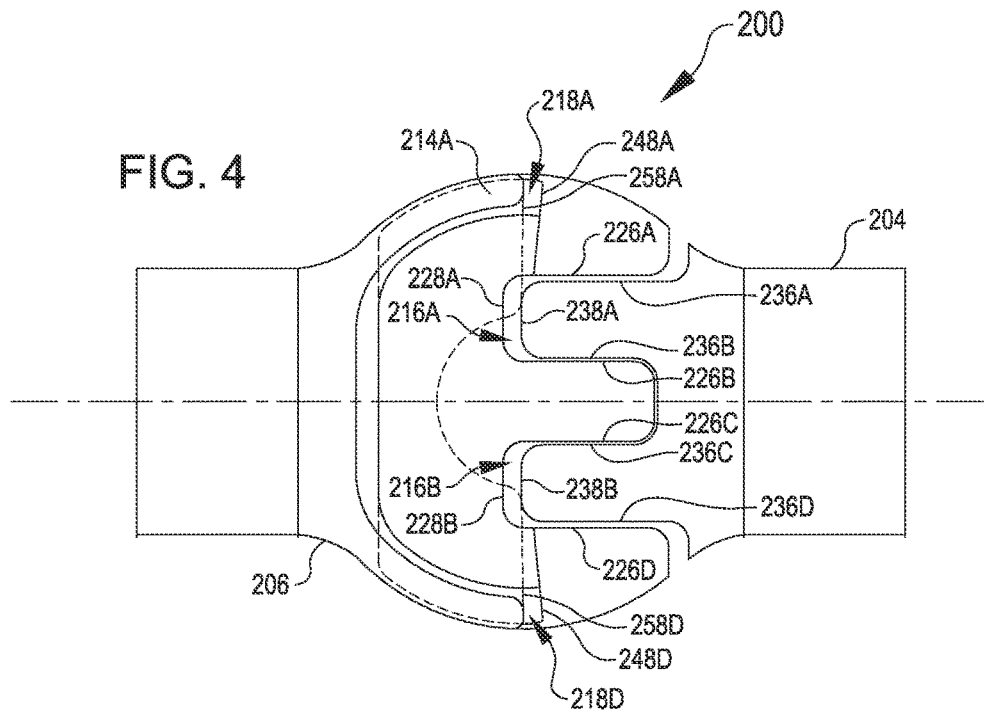
FIG. 4 is a side view showing the constant-velocity joint of FIGS. 2-3 in a state without inclination according to some aspects of the present disclosure.

FIG. 4 is a side view of the constant-velocity joint 200 in the absence of inclination. In this state, the torque surfaces 226A, 226B, 226C and 226D are respectively engaged or facing the torque surfaces 236A, 236B, 236C and 236D of the first adaptor 204. Such an arrangement can provide a significant amount of surface area for torque to be transferred between the first adaptor 204 and the yoke 202 during operation of the constant-velocity joint 200.

A gap 216A is present in FIG. 4 between the tip 238A and the constraining surface 228A. Likewise, a gap 216B is present between the tip 238B and the constraining surface 228B. A fork 214A of the second adaptor 206 is positioned within the yoke 202 such that similar gaps 218A, 218D are present between the tips 258A, 258D, and the constraining surfaces 248A, 248D.

Figure 5:
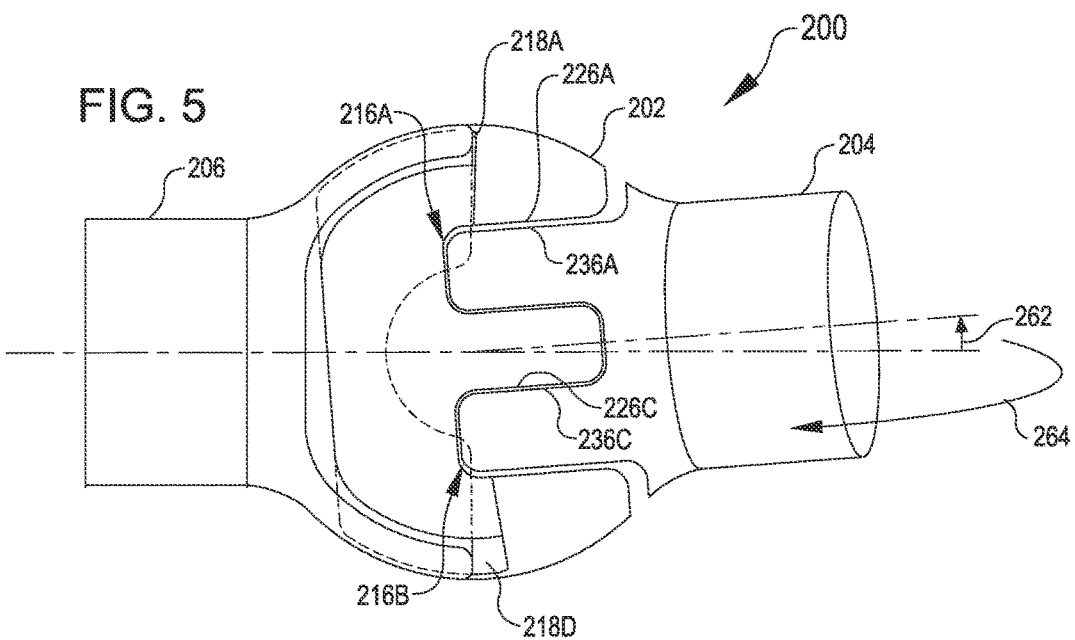
FIG. 5 is a side view of the constant-velocity joint of FIGS. 2-4 in a state with inclination in multiple directions according to some aspects of the present disclosure.

FIG. 5 is a side view illustrating the constant-velocity joint 200 in a state with inclination in multiple directions. The constant-velocity joint 200 may shift from the state shown in FIG. 4 to the state shown in FIG. 5A in response to movement of the first adaptor 204. For example, the first adaptor 204 may be moved in a first direction (e.g., in a clockwise direction in FIG. 5, as illustrated by arrow 262) and in a second, perpendicular direction (such as out of page of FIG. 5 as shown by arrow 264). In some aspects, such movement of the first adaptor 204 results from the first adaptor 204 being coupled with a source of eccentric rotation, such as the mud motor 118 described above with respect to FIG. 1. The second adaptor 206 may be maintained in place by a ring bearing or other device that permits the second adaptor 206 to rotate concentrically.

Movement of the first adaptor 204 in the first direction (e.g., arrow 262) can cause a corresponding movement of the yoke 202. For example, the movement of the first adaptor 204 can cause torque surfaces 236A, 236C on the first adaptor 204 to contact torque surfaces 226A, 226C on the yoke 202. Sufficient force (e.g. torque) can be transferred to the yoke 202 through this contact to cause the yoke 202 to move relative to the second adaptor 206. Movement of the yoke 202 can shift the distribution of the gaps 218A and 218D (e.g., moving from the state illustrated in FIG. 4 to the state illustrated in FIG. 5). For example, movement of the yoke 202 can cause the gap 218A to be reduced or eliminated while causing the gap 218D to be expanded or maximized.

Similarly, a movement in the second, perpendicular direction (e.g., arrow 264) can cause the gaps 216A and 216B to be reduced or eliminated. Movement in the second direction can cause the first adaptor 204 to slide in the first grooves 208 (e.g., as described above with respect to FIG. 3, such as being guided by the guide surface 224).

Figure 6:
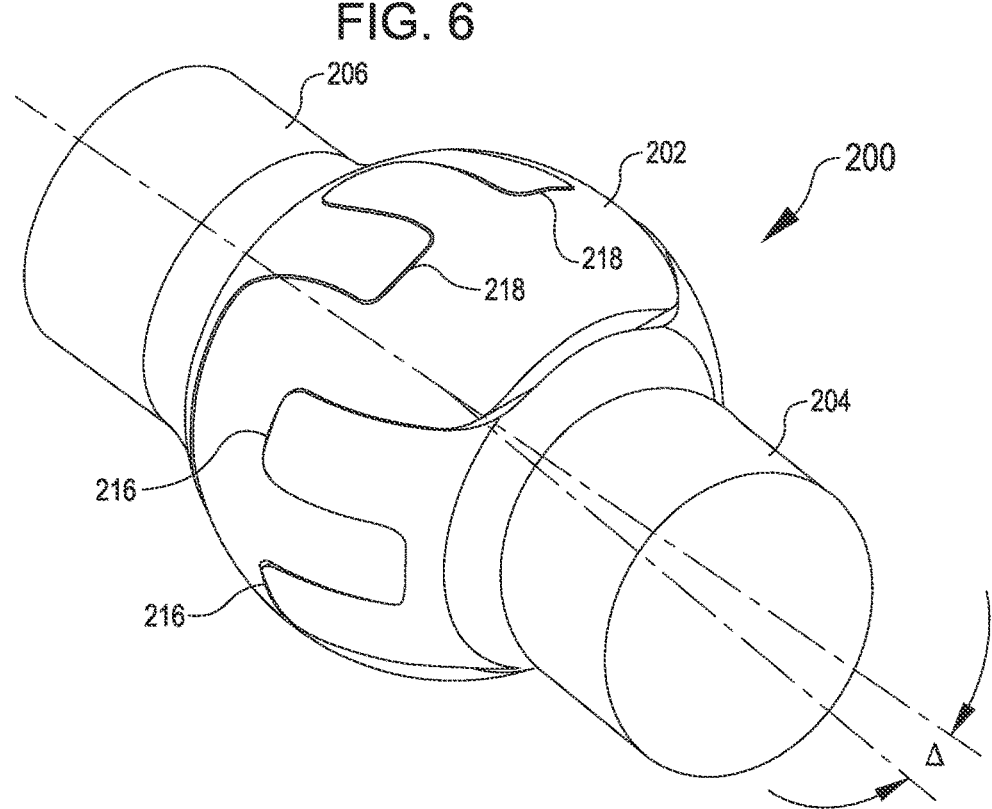
FIG. 6 is a perspective view of the constant-velocity joint of FIG. 5 according to some aspects of the present disclosure.

FIG. 6 is a perspective view showing the state shown in FIG. 5 of the constant-velocity joint 200. Although the movements were described with respect to FIG. 5 as two separate movements in two perpendicular axes, the overall position of the constant-velocity joint 200 may be considered to be a cumulative inclination of the constant-velocity joint 200 (e.g., a total amount of inclination A). In this way, the constant-velocity joint 200, while rotating with the first adaptor 204, may take up or let out more of the gaps 216, 218 in the constant-velocity joint 200 in order to convert or transfer eccentric rotational movement from one side of the constant-velocity joint 200 as concentric rotational movement on the other side. This arrangement can allow the motion to be transferred from one side to the other while still maintaining a consistent amount of surface area along surfaces at which torque will be transferred while the constant-velocity joint 200 is rotating.

In some embodiments, the yoke 202 is made of different material than the adaptors 204, 206. For example, the adaptors 204, 206 may be made of some variant or alloy of steel and the yoke 202 can be made of a material that more easily deforms. Non-limiting examples of suitable material for such a yoke 202 include titanium, beryllium copper alloy, aluminum bronze alloy, copper-nickel-tin alloy, iron-chromium-nickel-manganese-silicon alloy, cobalt-chromium-tungsten-carbon alloy, copper-chromium-molybdenum alloy, copper-chromium-nickel-molybdenum-iron-tungsten alloy, nickel-beryllium alloy. Making the components from different materials in this way can cause a difference in relative deformability of the components. The difference in relative deformability can allow the yoke 202 to deform slightly under force applied along the torque-carrying surfaces. This may cause the torque-carrying surfaces of the yoke 202 to more closely conform to the torque-carrying surfaces of the adaptors 204, 206. Greater conformity can yield a greater amount of contacting surface area for transfer of force between the components and reduce a risk that forces will be transferred as point loads or along line contacts that may more easily cause failure of components.

Figure 7:
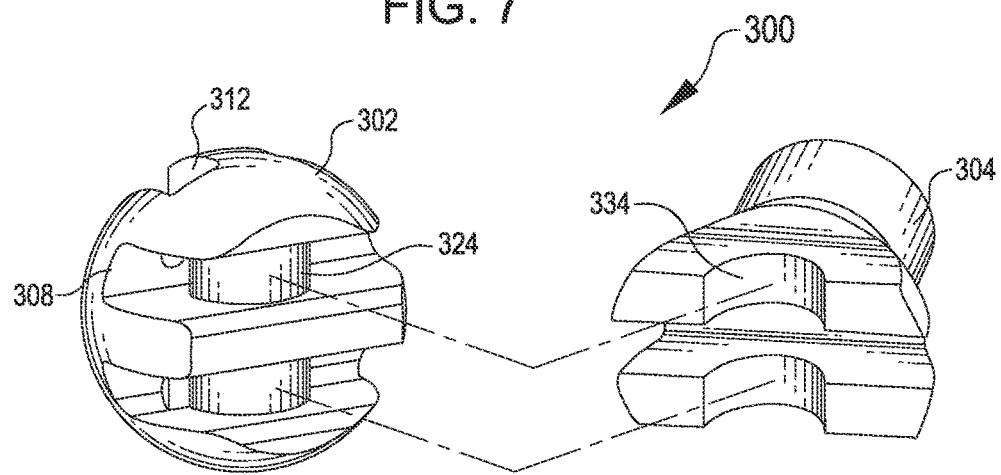
FIG. 7 is an exploded view of some components of another example of a constant-velocity joint according to some aspects of the present disclosure.

FIG. 7 illustrates an exploded assembly view of some components of another example of a constant-velocity joint 300 according to some aspects. The guide surface 324 and following surface and 234 illustrated in FIG. 7 are cylindrical. The cylindrical surfaces can allow the first adaptor 304 to pivot within the first grooves 308 to provide similar functionality to the constant-velocity joint 200 described in other figures herein. Grooves 312 on an opposite side of the yoke 302 may include cylindrical surfaces that are oriented perpendicular to the cylindrical guide surfaces 324 in the grooves 308 shown in FIG. 7.

FIG. 8 is a flow chart illustrating an example of a method 400 for converting rotation with a constant velocity joint according to some aspects of the present disclosure. The method 400 can utilize components described herein, such as the constant-velocity joints 114, 200, 300 described above with respect to FIGS. 1-7 or variations thereof.

In block 410, a first adaptor can be received in a yoke of a constant velocity joint. The first adaptor can have a plurality of first forks each having at least one torque surface (e.g., first adaptor 204 with forks 210 and torque surface 236). The first adaptor may also have first following surfaces (e.g., following surfaces 234). The yoke can have first grooves each receiving the at least one torque surface of a respective first fork (e.g., yoke 202 with first grooves 208). The first grooves may have first guide surfaces (e.g., guide surfaces 224). The first grooves can match the first following surfaces so that the first following surfaces can pivot along the first guide surfaces.

In block 420, a second adaptor can be received in the yoke of the constant velocity joint. The second adaptor can have a plurality of second forks each having at least one torque surface (e.g., second adaptor 206 with forks 214 and corresponding torque surfaces similar to torque surfaces 236). The second adaptor may also have second following surfaces (e.g., similar to following surfaces 234). The yoke can have second grooves each receiving the at least one torque surface of a respective second fork (e.g., yoke 202 with second grooves 212). The second grooves may have second guide surfaces (e.g., similar to guide surfaces 224 and in some aspects oriented perpendicular to the guide surfaces 224). The second grooves can match the second following surfaces so that the second following surfaces can pivot along the second guide surfaces.

In block 430, an eccentric rotation can be received by the first adaptor. For example, the eccentric rotation can be received from a mud motor (e.g., mud motor 118).

In block 440, at least one adaptor can be pivoted relative to the yoke in response to the eccentric rotation. For example, the first adaptor can be pivoted in the first grooves (e.g., the first following surfaces can pivot along the first guide surfaces, such as to close the gaps 216 in shifting from the position of FIG. 4 to FIG. 5), and additionally or alternatively, the second adaptor can be pivoted in the second grooves (e.g., the second following surfaces can pivot along the second guide surfaces, such as to close the gaps 218 in shifting from the position of FIG. 4 to FIG. 5). In some aspects, the method includes maintaining an amount of surface contact between each first groove and the at least one torque surface of the respective first fork in response to response to the receiving the eccentric rotation by the first adaptor. In some aspects, the maintained amount of surface contact may be a result of pivoting at least one adaptor relative to the yoke in response to the eccentric rotation.

In block 450, torque can be communicated from the first adaptor to the yoke. The torque may be communicated by engagement of the torque surfaces of the first forks with the first grooves (e.g., via torque surfaces 226, 236). The torque may be communicated in response to receiving the eccentric rotation by the first adaptor.

In block 460, torque can be communicated from the yoke to the second adaptor. The torque may be communicated by engagement of the torque surfaces of the second forks with the second grooves (e.g., in a manner similar to torque surfaces 226, 236). The torque may be communicated in response to communicating torque from the first adaptor to the yoke.

In block 470, concentric rotation can be communicated by the second adaptor. For example, the concentric rotation can be communicated to a drill bit (e.g., drill bit 116).

In some aspects, downhole tool, a system, or a method is provided according to one or more of the following examples or according to some combination of the elements thereof. In some aspects, a tool or a system described in one or more of these examples can be utilized to perform a method described in one of the other examples.

EXAMPLE #1

Provided can be a constant-velocity joint comprising: (i) a yoke comprising a plurality of grooves, the plurality of grooves including first grooves in a first side of the yoke and second grooves in a second side of the yoke; (ii) a first adaptor comprising a plurality of first forks, each respective first fork having at least one first torque surface received in a respective of the first grooves for transferring torque from the first adaptor to the yoke; and (iii) a second adaptor comprising a plurality of second forks, each respective second fork having at least one second torque surface received in a respective of the second grooves for transferring torque from the yoke to the second adaptor.

EXAMPLE #2

Provided can be the constant-velocity joint of Example #1, wherein each respective first groove has at least one first guide surface and each respective first fork has at least one first following surface slidable along the at least one first guide surface of the respective first groove; and wherein each respective second groove has at least one second guide surface and each respective second fork has at least one second following surface slidable along the at least one second guide surface of the respective second groove.

EXAMPLE #3

Provided can be the constant-velocity joint of Example #2 (or any of Examples #1-2), wherein at one first guide surface and at least one following surface are spherical.

EXAMPLE #4

Provided can be the constant-velocity joint of Example #2 (or any of Examples #1-3), wherein the yoke further comprises a spherical volume having a spherical boundary, wherein the at least one first guide surface and the at least one second guide surface define different portions of the spherical boundary.

EXAMPLE #5

Provided can be the constant-velocity joint of Example #2 (or any of Examples #1-4), wherein at least one guide surface and at least one following surface are cylindrical.

EXAMPLE #6

Provided can be the constant-velocity joint of Example #1 (or any of Examples #1-5), wherein the yoke is spherical.

EXAMPLE #7

Provided can be the constant-velocity joint of Example #1 (or any of Examples #1-6), wherein the second grooves are arranged perpendicular to the first grooves.

EXAMPLE #8

Provided can be the constant-velocity joint of Example #1 (or any of Examples #1-7), wherein each respective first groove has a length greater than a length of the respective first fork such that the respective first fork is pivotable between the sides of the respective first groove; and wherein each respective second groove has a length greater than a length of the respective second fork such that the respective second fork is pivotable between the sides of the respective second groove.

EXAMPLE #9

Provided can be a downhole assembly (which may incorporate features of any of Examples #1-8) comprising:(i) a first adaptor comprising a plurality of first forks each having at least one torque surface; (ii) a first object coupled with the first adaptor to provide eccentric rotation to the first adaptor; (iii) a yoke comprising a plurality of grooves, the plurality of grooves including first grooves in a first side of the yoke and second grooves in a second side of the yoke, the first grooves each respectively receiving at least one torque surface of a respective first fork for torque transferring from the first adaptor to the yoke in response to the eccentric rotation provided to the first adaptor from the first object; (iv) a second adaptor comprising a plurality of second forks each having at least one torque surface, the second grooves of the yoke each respectively receiving at least one torque surface of a respective second fork for torque transferring from the yoke to the second adaptor in response to the torque transferring from the first adaptor to the yoke; and (v) a second object coupled with the second adaptor to receive concentric rotation from the second adaptor in response to the torque transferring from the yoke to the second adaptor.

EXAMPLE #10

Provided can be the downhole assembly of Example #9, wherein:(a) each first groove comprises at least one first guide surface positioned between flanks of the first groove; (b) each second groove comprises at least one second guide surface positioned between flanks of the second groove; (c) each of the first forks comprises (i) two prongs, (ii) at least one first following surface positioned between the two prongs and slidable along at least one first guide surface, and (iii) the at least one torque surface positioned along a flank of at least one of the prongs; and (d) each of the second forks comprises (i) two prongs, (ii) at least one second following surface positioned between the two prongs and slidable along at least one second guide surface, and (iii) the at least one torque surface positioned along a flank of at least one of the prongs.

EXAMPLE #11

Provided can be the downhole assembly of Example #10 (or any of Examples #9-10), wherein the at least one first guide surface and the at least one second guide surface are spherical.

EXAMPLE #12

Provided can be the downhole assembly of Example #10 (or any of Examples #9-11), wherein the at least one first guide surface is cylindrical and the at least one second guide surface is cylindrical and oriented perpendicular to the at least one first guide surface.

EXAMPLE #13

Provided can be the downhole assembly of Example #9 (or any of Examples #9-12), wherein the first object is a mud motor and the second object is a drill bit.

EXAMPLE #14

Provided can be the downhole assembly of Example #8 (or any of Examples #9-13), wherein the yoke is made of a first material and at least one of the first adaptor or the second adaptor is made of a second material, wherein the first material and the second material have different relative deformability.

EXAMPLE #15

Provided can be the downhole assembly of Example #9 (or any of Examples #9-14), further comprising a joint coupling the second object with the second adaptor, the joint comprising:(a) a third adaptor comprising a plurality of third forks each having at least one torque surface; (b) a fourth adaptor comprising a plurality of fourth forks each having at least one torque surface; and (c) a second yoke comprising a second plurality of grooves, the second plurality of grooves including third grooves and fourth grooves, the third grooves each respectively receiving at least one torque surface of a respective third fork for torque transferring from the third adaptor to the second yoke, and the fourth grooves each respectively receiving at least one torque surface of a respective fourth fork for torque transferring from the second yoke to the fourth adaptor.

EXAMPLE #16

Provided can be a method (which may incorporate features of any of Examples #1-15) comprising:(i) receiving an eccentric rotation by a first adaptor of a constant-velocity joint, the first adaptor having a plurality of first forks each having at least one torque surface; (ii) receiving the first adaptor in a yoke of the constant-velocity joint, the yoke having first grooves each receiving the at least one torque surface of a respective first fork; (iii) communicating torque from the first adaptor to the yoke by engagement of the torque surfaces of the first forks with the first grooves in response to the receiving the eccentric rotation by the first adaptor; (iv) receiving a second adaptor of the constant-velocity joint in the yoke, the second adaptor having a plurality of second forks each having at least one torque surface, the yoke having second grooves each receiving the at least one torque surface of a respective second fork; (v) communicating torque from the yoke to the second adaptor by engagement of the torque surfaces of the second forks with the second grooves in response to the communicating torque from the first adaptor to the yoke; and (vi) communicating a concentric rotation by the second adaptor in response to the communicating torque from the yoke to a second adaptor.

EXAMPLE #17

Provided can be the method of Example #16, further comprising, in response to the receiving the eccentric rotation by the first adaptor, at least one of:(a) pivoting the first adaptor in the first grooves, the first grooves having first guide surfaces and the first adaptor having first following surfaces such that pivoting the first adaptor in the first grooves comprises pivoting the first following surfaces along the first guide surfaces; or (b) pivoting the second adaptor in the second grooves, second first grooves having second guide surfaces and second first adaptor having second following surfaces such that pivoting the second adaptor in the second grooves comprises pivoting the second following surfaces along the second guide surfaces.

EXAMPLE #18

Provided can be the method of Example #16 (or any of Examples #16-17), further comprising maintaining an amount of surface contact between each first groove and the at least one torque surface of the respective first fork in response to response to the receiving the eccentric rotation by the first adaptor.

EXAMPLE #19

Provided can be the method of Example #16 (or any of Examples #16-18), further comprising maintaining an amount of surface contact between each second groove and the at least one torque surface of the respective second fork in response to response to the receiving the eccentric rotation by the second adaptor.

EXAMPLE #20

Provided can be the method of Example #16 (or any of Examples #16-19), wherein receiving an eccentric rotation by a first adaptor of a constant-velocity joint comprises receiving an eccentric rotation from a mud motor; and wherein communicating a concentric rotation by the second adaptor comprises communicating a concentric rotation to a drill bit.

EXAMPLE #21

Provided can be a downhole assembly (which may incorporate features of any of Examples #1-20) comprising: (i) a motor; (ii) a drill bit; and (iii) a constant-velocity joint coupling the motor with the drill bit, the constant velocity joint comprising: (a) a first adaptor coupled with the motor and comprising a plurality of first forks each having at least one torque surface; (b) a yoke comprising a plurality of grooves, the plurality of grooves including first grooves in a first side of the yoke and second grooves in a second side of the yoke, the first grooves each respectively receiving at least one torque surface of a respective first fork for torque transferring from the first adaptor to the yoke in response to rotation provided to the first adaptor from the motor; and (c) a second adaptor comprising a plurality of second forks each having at least one torque surface, the second grooves of the yoke each respectively receiving at least one torque surface of a respective second fork for torque transferring from the yoke to the second adaptor in response to the torque transferring from the first adaptor to the yoke, the motor coupled with the second adaptor to receive rotation from the second adaptor in response to the torque transferring from the yoke to the second adaptor.

The foregoing description, including illustrated aspects and examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

What is claimed is:
1. A constant-velocity joint comprising:
   a yoke comprising a plurality of grooves, the plurality of grooves including first grooves with at least one first groove torque surface in a first side of the yoke and second grooves with at least one second groove torque surface in a second side of the yoke;
   a first adaptor comprising a plurality of first forks, each respective first fork having at least one first adaptor torque surface received in a respective of the first grooves for transferring torque from the first adaptor to the yoke;
   a second adaptor comprising a plurality of second forks, each respective second fork having at least one second adaptor torque surface received in a respective of the second grooves for transferring torque from the yoke to the second adaptor,
   wherein each respective first groove has at least one first guide surface extending from the at least one first groove torque surface, and each respective first fork has at least one first following surface slidable along the at least one first guide surface of the respective first groove; and
   wherein each respective second groove has at least one second guide surface extending from the at least one second groove torque surface, and each respective second fork has at least one second following surface slidable along the at least one second guide surface of the respective second groove.

2. The constant-velocity joint of claim 1, wherein at least one first guide surface and at least one following surface are spherical.

3. The constant-velocity joint of claim 1, wherein the yoke further comprises a spherical volume having a spherical boundary, wherein the at least one first guide surface and the at least one second guide surface define different portions of the spherical boundary.

4. The constant-velocity joint of claim 1, wherein at least one guide surface and at least one following surface are cylindrical.

5. The constant-velocity joint of claim 1, wherein the yoke is spherical.

6. The constant-velocity joint of claim 1, wherein the second grooves are arranged perpendicular to the first grooves.

7. The constant-velocity joint of claim 1, wherein each respective first groove has a length greater than a length of the respective first fork such that the respective first fork is pivotable between sides of the respective first groove; and wherein each respective second groove has a length greater than a length of the respective second fork such that the respective second fork is pivotable between the sides of the respective second groove.

* * * * *